US008481652B2

(12) United States Patent
Jain et al.

(10) Patent No.: US 8,481,652 B2
(45) Date of Patent: Jul. 9, 2013

(54) THERMOPLASTIC POLYAMIDES HAVING POLYETHER AMINES

(75) Inventors: Sachin Jain, Mannheim (DE); Philippe Desbois, Edingen-Neckarhausen (DE); Claus Gabriel, Griesheim (DE); Martin Weber, Maikammer (DE); Peter Eibeck, Speyer (DE); Bernd Bruchmann, Freinsheim (DE); Martin Klatt, Mannheim (DE)

(73) Assignee: BASF SE (DE)

( * ) Notice: Subject to any disclaimer, the term of this patent is extended or adjusted under 35 U.S.C. 154(b) by 54 days.

(21) Appl. No.: 12/809,478

(22) PCT Filed: Dec. 15, 2008

(86) PCT No.: PCT/EP2008/067519
§ 371 (c)(1), (2), (4) Date: Jun. 18, 2010

(87) PCT Pub. No.: WO2009/077492
PCT Pub. Date: Jun. 25, 2009

(65) Prior Publication Data
US 2011/0009566 A1    Jan. 13, 2011

(30) Foreign Application Priority Data
Dec. 18, 2007 (EP) .................... 07123450

(51) Int. Cl.
*C08L 77/00* (2006.01)
(52) U.S. Cl.
USPC ............ 525/420; 524/538; 525/430; 525/435
(58) Field of Classification Search
USPC .................... 524/538; 525/420, 430, 434
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,178,173 A | 10/1939 | Katzman et al. |
| 2,241,322 A | 5/1941 | Hanford |
| 2,290,415 A | 7/1942 | DeGroote |
| 2,312,966 A | 3/1943 | Hanford |
| 2,407,895 A | 9/1946 | Monson et al. |
| 2,512,606 A | 6/1950 | Bolton et al. |
| 3,393,210 A | 7/1968 | Speck |
| 3,651,014 A | 3/1972 | Witsiepe |
| 4,144,123 A | 3/1979 | Scharf et al. |
| 4,360,617 A | 11/1982 | Muller et al. |
| 4,404,362 A | 9/1983 | Bellos |
| 4,617,355 A * | 10/1986 | Gabbert et al. ............... 525/420 |
| 5,272,236 A | 12/1993 | Lai et al. |
| 6,342,295 B1 | 1/2002 | Kobayashi |
| 7,700,669 B2 | 4/2010 | Gottschalk-Gaudig et al. |
| 2007/0060719 A1 | 3/2007 | Clement et al. |

FOREIGN PATENT DOCUMENTS

| | | |
|---|---|---|
| CA | 963594 A1 | 2/1975 |
| CA | 2035565 A1 | 8/1991 |
| CZ | 265929 | 4/1990 |
| DE | 2702661 A1 | 8/1977 |
| DE | 4003243 A1 | 8/1991 |
| DE | 4104834 A1 | 9/1991 |
| DE | 19963188 B1 | 9/2000 |
| DE | 19931720 A1 | 1/2001 |
| DE | 10313681 A1 | 10/2004 |
| EP | 25515 A1 | 3/1981 |
| EP | 0038094 A2 | 10/1981 |
| EP | 0038582 A2 | 10/1981 |
| EP | 129195 A2 | 12/1984 |
| EP | 129196 A2 | 12/1984 |
| EP | 208187 A2 | 1/1987 |
| EP | 299444 A2 | 1/1989 |
| EP | 675914 A1 | 10/1995 |
| EP | 0791606 A2 | 8/1997 |
| EP | 895521 A1 | 2/1999 |
| EP | 922065 A2 | 6/1999 |
| EP | 1198491 A1 | 4/2002 |
| EP | 1424360 A1 | 6/2004 |
| EP | 1845136 A1 | 10/2007 |
| WO | WO-94/12560 A1 | 6/1994 |
| WO | WO-97/45474 A1 | 12/1997 |
| WO | WO-2006/042705 A1 | 4/2006 |
| WO | WO-2009/050094 A1 | 4/2009 |

OTHER PUBLICATIONS

Gaechter, Mueller, "Kunststoffadditive [Plastics Additives]," 3rd Ed., pp. 479, 486-488, Carl Hanser Verlag (1989).

(Continued)

*Primary Examiner* — Ana Woodward
(74) *Attorney, Agent, or Firm* — Novak Druce Connolly Bove + Quigg LLP

(57) ABSTRACT

Thermoplastic molding compositions comprising A) from 10 to 99% by weight of at least one thermoplastic polyamide, B) from 0.01 to 30% by weight of at least one highly branched or hyperbranched polyetheramine, C) from 0 to 70% by weight of further added materials, where the total of the percentages by weight of components A) to C) is 100%; the use of polyetheramines for improving the flowability and/or thermal stability of polyamides; and to the use of the molding compositions for the production of fibers, of foils, or of moldings of any type, and also to the resultant fibers, foils, or moldings.

8 Claims, No Drawings

OTHER PUBLICATIONS

Flory, J.P., "Molecular Size Distribution in Three Dimensional Polymers. VI. Branched Polymers Containing A-R-$B_{f-1}$ Type Units," *J. Am. Chem. Soc.*, 1952, vol. 74, No. 11, pp. 2718-2713.

Sunder, et al., "Controlling the Growth of Polymer Trees: Concepts and Perspectives for Hyperbranched Polymers," *Chem. Eur. J.*, 2000, vol. 6, No. 14, pp. 2499-2506.

* cited by examiner

THERMOPLASTIC POLYAMIDES HAVING POLYETHER AMINES

CROSS-REFERENCE TO RELATED APPLICATIONS

This application is a national stage application, under 35 U.S.C. §371, of PCT/EP2008/067519, filed Dec. 15, 2008, which claims benefit of European Patent Application No. 07123450.4, filed Dec. 18, 2007.

BACKGROUND OF THE INVENTION

Polyetheramines or polyetheramine polyols are usually obtained from trialkanolamines, e.g. triethanolamine, tripropanolamine, triisopropanolamine, optionally in a mixture with mono- or dialkanolamines, by etherifying these monomers with catalysis, e.g. with acidic or basic catalysis, with elimination of water. The preparation of these polymers is described by way of example in U.S. Pat. No. 2,178,173, U.S. Pat. No. 2,290,415, U.S. Pat. No. 2,407,895, and DE 40 03 243. The polymerization reaction can take place randomly, or block structures can be prepared from individual alkanolamines, these being linked to one another in a further reaction (in which connection see also U.S. Pat. No. 4,404,362).

The polyetheramines or polyetheramine polyols described in the abovementioned literature are used in free or quaternized form by way of example as emulsifiers for oil/water mixtures, as finishing agents for dyed leather (DE 41 04 834), or as lubricants for metal processing (CS 265 929).

Lubricants are generally added to improve the flow of thermoplastic polyesters and polycarbonates (see Gächter, Müller: Kunststoffadditive [Plastics Additives], 3rd edition pp. 479, 486-488, Carl Hanser Verlag 1989). Particular disadvantages here are the efflorescence of the additives during processing.

WO 97/45474, and also EP-A 14 24 360 and WO 2006/42705 disclose dendritic polymers and dendrimers as addition to improve the flowability of thermoplastics. Disadvantages here are a large reduction in effectiveness as a function of the matrix polymer and/or in the case of high-molecular-weight thermoplastics.

BRIEF SUMMARY OF THE INVENTION

The invention relates to thermoplastic molding compositions comprising A) from 10 to 99% by weight of at least one thermoplastic polyamide, B) from 0.01 to 30% by weight of at least one highly branched or hyperbranched polyetheramine, C) from 0 to 70% by weight of further added materials, where the total of the percentages by weight of components A) to C) is 100%.

The invention further relates to the use of polyetheramines for improving the flowability and/or thermal stability of polyamides, to the use of the molding compositions for the production of fibers, of foils, or of moldings of any type, and also to the resultant fibers, foils, or moldings.

It was therefore an object of the present invention to improve the flowability and/or thermal stability of polyamide molding compositions, while minimizing the fall-off of molecular weight. The intention was moreover to minimize the amounts of the additive in the matrix, to maximize retention of the mechanical properties of the molding compositions, and to avoid efflorescence of the additive during processing.

Accordingly, the thermoplastic molding compositions mentioned in the introduction have been found, as also have their use and the moldings, foils, and fibers obtainable from the molding compositions. The subclaims give preferred embodiments of the invention.

Note relating to the quantitative data given below: the amounts of components A) to C) for the thermoplastic molding composition are selected within the ranges mentioned in such a way that the entirety of components A) and B), and also, if appropriate, C), gives a total of 100% by weight; component C) is optional.

The molding compositions of the invention comprise, as component A), from 10 to 99% by weight, preferably from 20 to 99% by weight, and in particular from 30 to 98% by weight, of at least one thermoplastic polyamide A).

DETAILED DESCRIPTION OF THE INVENTION

The intrinsic viscosity of the polyamides of the molding compositions of the invention is generally from 70 to 350 ml/g, preferably from 70 to 200 ml/g, determined in a 0.5% strength by weight solution in 96% strength by weight sulfuric acid at 25° C. to ISO 307.

Semicrystalline or amorphous resins whose molecular weight (weight-average) is at least 5000 are preferred, examples being those described in the U.S. Pat. Nos. 2,071,250, 2,071,251, 2,130,523, 2,130,948, 2,241,322, 2,312,966, 2,512,606, and 3,393,210.

Examples of these are polyamides which derive from lactams having from 7 to 13 ring members, for example polycaprolactam, polycaprylolactam, and polylaurolactam, and also polyamides obtained via reaction of dicarboxylic acids with diamines.

Dicarboxylic acids that can be used are alkanedicarboxylic acids having from 6 to 12, in particular from 6 to 10 carbon atoms, and aromatic dicarboxylic acids. Just a few acids that may be mentioned here are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di-(4-aminocyclohexyl)methane, 2,2-di(4-aminophenyl)propane, 2,2-di(4-aminocyclohexyl)propane, or 1,5-diamino-2-methylpentane.

Preferred polyamides are polyhexamethyleneadipamide, polyhexamethylenesebacamide, and polycaprolactam, and also nylon-6/6,6 copolyamides, in particular having from 5 to 95% by weight content of caprolactam units.

Other suitable polyamides are obtainable from ω-aminoalkylnitriles, such as aminocapronitrile (PA 6) and adipodinitrile with hexamethylenediamine (PA 66), by what is known as direct polymerization in the presence of water, as described by way of example in DE-A 10313681, EP-A 1198491, and EP 922065.

Mention may also be made of polyamides obtainable by way of example via condensation of 1,4-diaminobutane with adipic acid at an elevated temperature (nylon-4,6). Preparation processes for polyamides of said structure are described by way of example in EP-A 38 094, EP-A 38 582, and EP-A 39 524.

Other suitable polyamides are those obtainable via copolymerization of two or more of the abovementioned monomers, or a mixture of a plurality of polyamides, in any desired mixing ratio.

Semiaromatic copolyamides, such as PA 6/6T and PA 66/6T, have moreover proven particularly advantageous, in particular those whose triamine content is less than 0.5% by weight, preferably less than 0.3% by weight (see EP-A 299 444).

The processes described in EP-A 129 195 and 129 196 can be used to prepare the preferred semiaromatic copolyamides having low triamine content.

The preferred semiaromatic copolyamides A) comprise, as component $a_1$), from 40 to 90% by weight of units which derive from terephthalic acid and from hexamethylenediamine. A small proportion of the terephthalic acid, preferably not more than 10% by weight of the entire aromatic dicarboxylic acids used, can be replaced by isophthalic acid or other aromatic dicarboxylic acids, preferably those in which the carboxy groups are in para position.

The semiaromatic copolyamides comprise, alongside the units which derive from terephthalic acid and from hexamethylenediamine, units which derive from ☐-caprolactam ($a_2$), and/or units which derive from adipic acid and hexamethylenediamine ($a_3$).

The proportion of units which derive from ☐-caprolactam is at most 50% by weight, preferably from 20 to 50% by weight, in particular from 25 to 40% by weight, while the proportion of units which derive from adipic acid and hexamethylenediamine is up to 60% by weight, preferably from 30 to 60% by weight, and in particular from 35 to 55% by weight.

The copolyamides can also comprise not only units of ε-caprolactam but also units of adipic acid and hexamethylenediamine; in this case, care has to be taken that the proportion of units free from aromatic groups is at least 10% by weight, preferably at least 20% by weight. The ratio of the units which derive from ε-caprolactam and from adipic acid and hexamethylenediamine here is not subject to any particular restriction.

Polyamides which have proven particularly advantageous for many applications are those having from 50 to 80% by weight, in particular from 60 to 75% by weight, of units which derive from terephthalic acid and from hexamethylenediamine (units $a_1$)) and from 20 to 50% by weight, preferably from 25 to 40% by weight, of units which derive from ε-caprolactam (units $a_2$)).

The semiaromatic copolyamides of the invention can also comprise, alongside the units $a_1$) to $a_3$) described above, a subordinate amount which is preferably not more than 15% by weight, in particular not more than 10% by weight, of the other polyamide units ($a_4$) known from other polyamides. These units can derive from dicarboxylic acids having from 4 to 16 carbon atoms and from aliphatic or cycloaliphatic diamines having from 4 to 16 carbon atoms, and also from aminocarboxylic acids and, respectively, corresponding lactams having from 7 to 12 carbon atoms. Suitable monomers of these types that may be mentioned here merely as examples are suberic acid, azelaic acid, sebacic acid, or isophthalic acid as representatives of the dicarboxylic acids, 1,4-butanediamine, 1,5-pentanediamine, piperazine, 4,4'-diaminodicyclohexylmethane, and 2,2-(4,4'-diaminodicyclohexyl)propane or 3,3'-dimethyl-4,4'-diaminodicyclohexylmethane as representatives of the diamines, and caprylolactam, enantholactam, omega-aminoundecanoic acid, and laurolactam as representatives of lactams and, respectively, aminocarboxylic acids.

The melting points of the semiaromatic copolyamides A) are in the range from 260 to more than 300° C., and this high melting point is also associated with a high glass transition temperature which is generally more than 75° C., in particular more than 85° C.

If binary copolyamides based on terephthalic acid, hexamethylenediamine, and ε-caprolactam have about 70% by weight content of units derived from terephthalic acid and from hexamethylenediamine, their melting points are in the region of 300° C. and their glass transition temperature is above 110° C.

Binary copolyamides based on terephthalic acid, adipic acid, and hexamethylenediamine (HMD) achieve melting points of 300° C. and more even at relatively low contents of units derived from terephthalic acid and from hexamethylenediamine, of about 55% by weight, but here the glass transition temperature is not quite as high as for binary copolyamides which comprise ε-caprolactam instead of adipic acid or adipic acid/HMD.

The following list, which is not comprehensive, comprises the polyamides A) mentioned and other polyamides A) for the purposes of the invention, and the monomers comprised.

| AB polymers: | |
|---|---|
| PA 4 | Pyrrolidone |
| PA 6 | ε-Caprolactam |
| PA 7 | Ethanolactam |
| PA 8 | Caprylolactam |
| PA 9 | 9-Aminopelargonic acid |
| PA 11 | 11-Aminoundecanoic acid |
| PA 12 | Laurolactam |
| AA/BB polymers | |
| PA 46 | Tetramethylenediamine, adipic acid |
| PA 66 | Hexamethylenediamine, adipic acid |
| PA 69 | Hexamethylenediamine, azelaic acid |
| PA 610 | Hexamethylenediamine, sebacic acid |
| PA 612 | Hexamethylenediamine, decanedicarboxylic acid |
| PA 613 | Hexamethylenediamine, undecanedicarboxylic acid |
| PA 1212 | 1,12-Dodecanediamine, decanedicarboxylic acid |
| PA 1313 | 1,13-Diaminotridecane, undecanedicarboxylic acid |
| PA 6T | Hexamethylenediamine, terephthalic acid |
| PA 9T | Nonyldiamine/terephthalic acid |
| PA MXD6 | m-Xylylenediamine, adipic acid |
| PA 6I | Hexamethylenediamine, isophthalic acid |
| PA 6-3-T | Trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | Diaminodicyclohexylmethane, laurolactam |
| PA 6I/6T/PACM | as PA 6I/6T + diaminodicyclohexylmethane |
| PA 12/MACMI | Laurolactam, dimethyldiaminodicyclohexylmethane, isophthalic acid |
| PA 12/MACMT | Laurolactam, dimethyldiaminodicyclohexylmethane, terephthalic acid |
| PA PDA-T | Phenylenediamine, terephthalic acid |

However, it is also possible to use a mixture of the above polyamides.

The molding compositions of the invention comprise, as component B), from 0.01 to 30% by weight, preferably from 0.05 to 10% by weight, and in particular from 0.05 to 5% by weight, of at least one hyperbranched polyetheramine.

Component B) is obtainable via reaction of at least one tertiary amine having functional hydroxy groups, preferably of at least one di-, tri- or tetraalkanolamine, with, if appropriate, secondary amines which bear hydroxy groups as substituents, in particular with dialkanolamines or, if appropriate, with polyether polyols whose functionality is 2 or higher, preferably in the presence of a transetherification and etherification catalyst.

Preferred tertiary dialkanolamines having functional hydroxy groups are diethanolalkylamines having C1-C30, in particular having C1-C18-alkyl radicals,
  diethanolamine,
  dipropanolamine,
  diisopropanolamine,
  dibutanolamine,
  dipentanolamine,
  dihexanolamine,
  N-methyldiethanolamine,
  N-methyldipropanolamine,
  N-methyldiisopropanolamine,
  N-methyldibutanolamine,
  N-methyldipentanolamine,
  N-methyldihexanolamine,
  N-ethyldiethanolamine,
  N-ethyldipropanolamine,
  N-ethyldiisopropanolamine,
  N-ethyldibutanolamine,
  N-ethyldipentanolamine,
  N-ethyldihexanolamine,
  N-propyldiethanolamine,
  N-propyldipropanolamine,
  N-propyldiisopropanolamine,
  N-propyldibutanolamine,
  N-propyldipentanolamine,
  N-propyldihexanolamine,
  diethanolethylamine,
  diethanolpropylamine,
  diethanolmethylamine,
  dipropanolmethylamine,
  cyclohexanoldiethanolamine,
  dicyclohexanolethanolamine,
  cyclohexyldiethanolamine,
  dicyclohexyldiethanolamine,
  dicyclohexanolethylamine,
  benzyldiethanolamine,
  dibenzylethanolamine,
  benzyldipropanolamine,
  tripentanolamine,
  trihexanolamine,
  ethylhexylethanolamine,
  octadecyldiethanolamine,
  polyethanolamines,
and preferred trialkanolamines are
  trimethanolamine,
  triethanolamine,
  tripropanolamine,
  triisopropanolamine,
  tributanolamine,
  tripentanolamine,
  or the derivatives derived therefrom.

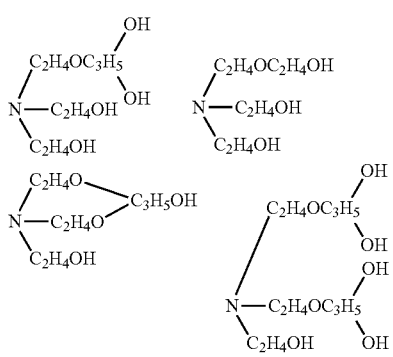

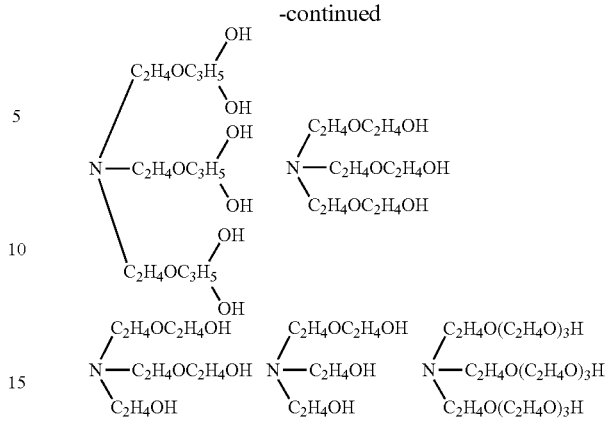

Preferred tetraalkanolamines are

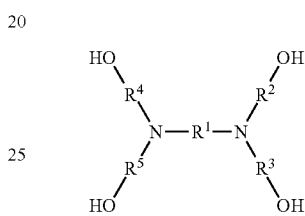

It is preferable that $R^1$=CH$_2$—CH$_2$ to (CH$_2$)$_8$, preferably (CH$_2$)$_2$—(CH$_2$)$_4$,
$R^2$-$R^{5'}$C$_2$ to C$_6$, preferably C$_2$ and C$_3$, e.g.
  N,N,N',N'-tetrahydroxyethylethylenediamine,
  N,N,N',N'-tetrahydroxyethylbutylenediamine,
  N,N,N',N'-tetrahydroxypropylethylenediamine,
  N,N,N',N'-tetrahydroxyisopropylethylenediamine,
  N,N,N',N'-tetrahydroxypropylbutylenediamine,
  N,N,N',N'-tetrahydroxyisopropylbutylenediamine.

Particularly preferred component B) is obtainable via intermolecular polycondensation of at least one trialkanolamine of the general formula

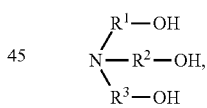

in which the radicals $R^1$ to $R^3$, independently of one another, are identical or different alkylene groups preferably having from 2 to 10 carbon atoms, with preference from 2 to 6 carbon atoms.

The starting material used preferably comprises triethanolamine, tripropanolamine, triisopropanolamine, or tributanolamine, or a mixture of these; if appropriate in combination with dialkanolamines, such as diethanolamine, dipropanolamine, diisopropanolamine, dibutanolamine, N,N'-dihydroxyalkylpiperidine (alkyl=C1-C8), dicyclohexanolamine, dipentanolamine, or dihexanolamine, preference being given to dialkanolamines here.

The abovementioned trialkanolamines can, if appropriate, moreover be used in combination with polyetherols of functionality two or higher, in particular those based on ethylene oxide and/or propylene oxide.

However, it is very particularly preferable that the starting material used comprises triethanolamine or triisopropanolamine, or a mixture of these.

The high-functionality highly branched or hyperbranched polyetheramines formed by the process of the invention have termination by hydroxy groups after the reaction, i.e. without further modification. They have good solubility in various solvents.

Examples of these solvents are aromatic and/or (cyclo) aliphatic hydrocarbons and mixtures of these, halogenated hydrocarbons, ketones, esters, and ethers.

Preference is given to aromatic hydrocarbons, (cyclo)aliphatic hydrocarbons, alkyl alkanoates, ketones, alkoxylated alkyl alkanoates, and mixtures of these.

Particular preference is given to mono- or polyalkylated benzenes and naphthalenes, ketones, alkyl alkanoates, and alkoxylated alkyl alkanoates, and also mixtures of these.

Preferred aromatic hydrocarbon mixtures are those which mainly comprise aromatic $C_7$-$C_{14}$ hydrocarbons and whose boiling range is from 110 to 300° C., particular preference being given to toluene, o-, m- or p-xylene, trimethylbenzene isomers, tetramethylbenzene isomers, ethylbenzene, cumene, tetrahydronaphthalene, and mixtures comprising these.

Examples of these compounds are the products with trademark Solvesso® from ExxonMobil Chemical, particularly Solvesso® 100 (CAS No. 64742-95-6, mainly $C_9$ and $C_{10}$ aromatic compounds, boiling range about 154-178° C.), 150 (boiling range about 182-207° C.) and 200 (CAS No. 64742-94-5), and also the products with trademark Shellsol® from Shell. Hydrocarbon mixtures based on paraffins, on cycloparaffins, and on aromatic compounds are also available commercially as gasoline (for example Kristallöl 30, boiling range about 158-198° C. or Kristallöl 60: CAS No. 64742-82-1), white spirit (an example likewise being CAS No. 64747-82-1), or solvent naphtha (light: boiling range about 155-180° C., heavy: boiling range about 225-300° C.). The content of aromatic compounds of these hydrocarbon mixtures is generally more than 90% by weight, preferably more than 95% by weight, particularly preferably more than 98% by weight, and very particularly preferably more than 99% by weight. It can be advisable to use hydrocarbon mixtures with particularly reduced content of naphthalene.

The content of aliphatic hydrocarbons is generally less than 5% by weight, preferably less than 2.5% by weight, and particularly preferably less than 1% by weight.

Examples of halogenated hydrocarbons are chlorobenzene and dichlorobenzene, or its isomer mixtures.

Examples of esters are n-butyl acetate, ethyl acetate, 1-methoxyprop-2-yl acetate, and 2-methoxyethyl acetate.

Examples of ethers are THF, dioxane, and also the dimethyl, ethyl, or n-butyl ether of ethylene glycol, diethylene glycol, triethylene glycol, propylene glycol, dipropylene glycol, or tripropylene glycol.

Examples of ketones are acetone, 2-butanone, 2-pentanone, 3-pentanone, hexanone, isobutyl methyl ketone, heptanone, cyclopentanone, cyclohexanone, or cycloheptanone.

Examples of (cyclo)aliphatic hydrocarbons are decalin, alkylated decalin, and isomer mixtures of straight-chain or branched alkanes and/or of cycloalkynes.

Preference is further given to n-butyl acetate, ethyl acetate, 1-methoxyprop-2-yl acetate, 2-methoxyethyl acetate, 2-butanone, isobutyl methyl ketone, and also mixtures of these, in particular with the aromatic hydrocarbon mixtures listed above.

These mixtures can be produced in a ratio by volume of from 5:1 to 1:5, preferably in a ratio by volume of from 4:1 to 1:4, particularly preferably in a ratio by volume of 3:1 to 1:3, and very particularly preferably in a ratio by volume of 2:1 to 1:2.

Preferred solvents are butyl acetate, methoxypropyl acetate, isobutyl methyl ketone, 2-butanone, Solvesso® grades, and xylene.

Examples of other solvents that can be suitable for the polyetheramines are water, alcohols, such as methanol, ethanol, butanol, alcohol/water mixtures, acetone, 2-butanone, dimethylformamide, dimethylacetamide, N-methylpyrrolidone, N-ethylpyrrolidone, ethylene carbonate, or propylene carbonate.

For the purposes of this invention, a high-functionality highly branched or hyperbranched polyetheramine is a product which has not only the ether groups and the amino groups which form the main structure of the polymer but also an average of at least three, preferably at least six, particularly preferably at least ten, terminal or pendent functional groups. The functional groups are OH groups. The number of the terminal or pendent functional groups is not in principle subject to any upper restriction, but products having a very large number of functional groups can have undesired properties, such as high viscosity or poor solubility. The high-functionality polyetheramine polyols of the present invention mostly do not have more than 500 terminal or pendent functional groups, preferably not more than 100 terminal or pendent groups.

For the purposes of this invention, hyperbranched polyetheramines are uncrosslinked macromolecules which have hydroxy, ether and amine groups, and have both structural and molecular nonuniformity. They can firstly be based on a central molecule by analogy with dendrimers, but with nonuniform chain length of the branches. Secondly, they can also have a linear structure, with functional pendent groups, or else, combining the two extremes, can have linear and branched portions of the molecule. For the definition of dendrimeric and hyperbranched polymers, see also P. J. Flory, J. Am. Chem. Soc. 1952, 74, 2718, and H. Frey et al., Chem. Eur. J. 2000, 6, No. 14, 2499.

The polyetheramines are prepared either in bulk or in solution. Solvents that can be used are the abovementioned solvents. Conduct of the reaction without solvent is a preferred embodiment.

The temperature during the preparation process should be sufficient for reaction of the amino alcohol. The temperature needed for the reaction is generally from 100° C. to 350° C., preferably from 150 to 300° C., particularly preferably from 180 to 280° C., and specifically from 200 to 250° C.

In one preferred embodiment, the condensation reaction is carried out in bulk. The water liberated during the reaction, or low-molecular-weight reaction products, can be removed from the reaction equilibrium, for example by distillation, if appropriate at reduced pressure, in order to accelerate the reaction.

The removal of the water or of the low-molecular-weight reaction products can also be promoted by passage of a gas stream which is substantially inert under the reaction conditions, e.g. nitrogen or noble gas, e.g. helium, neon, or argon, through the mixture (stripping).

Catalysts or catalyst mixtures can also be added to accelerate the reaction. Suitable catalysts are compounds which catalyze etherification or transetherification reactions, examples being alkali metal hydroxides, alkali metal carbonates, and alkali metal hydrogencarbonates, preferably of sodium, of potassium, or of cesium, acidic compounds such as iron chloride or zinc chloride, formic acid, oxalic acid, or phosphorus-comprising acidic compounds, such as phosphoric acid, polyphosphoric acid, phosphorous acid, or hypophosphorous acid.

It is preferable to use phosphoric acid, phosphorous acid, or hypophosphorous acid, if appropriate in a form diluted with water.

The amount generally added of the catalyst is from 0.001 to 10 mol %, preferably from 0.005 to 7 mol %, particularly preferably from 0.01 to 5 mol %, based on the amount of the alkanolamine or alkanolamine mixture used.

It is moreover also possible to control the intermolecular polycondensation reaction either via addition of the suitable catalyst or via selection of a suitable temperature. The constitution of the starting components and the residence time can moreover be used to adjust the average molecular weight of the polymer.

The polymers prepared at an elevated temperature are usually stable for a prolonged period, for example for at least 6 weeks, at room temperature without clouding, sedimentation, and/or any rise in viscosity.

There are various methods of terminating the intermolecular polycondensation reaction. By way of example, the temperature can be lowered to a range in which the reaction stops, and the polycondensation product is storage-stable. This is generally the case at below 60° C., preferably below 50° C., particularly preferably below 40° C., and very particularly preferably at room temperature.

The catalyst may moreover be deactivated, by way of example in the case of basic catalysts via addition of an acidic component, e.g. of a Lewis acid or of an organic or inorganic protic acid, and in the case of acidic catalysts via addition of a basic component, e.g. of a Lewis base or of an organic or inorganic base.

It is moreover possible to stop the reaction via dilution with a precooled solvent. This is preferred particularly when the viscosity of the reaction mixture has to be adjusted via addition of solvent.

The high-functionality highly branched or hyperbranched polyetheramines of the invention generally have a glass transition temperature below 50° C., preferably below 30° C., and particularly preferably below 10° C.

The OH number is mostly from 50 to 1000 mg KOH/g, preferably from 100 to 900 mg KOH/g, and very preferably from 150 to 800 mg KOH/g.

The weight-average molar mass $M_w$ is mostly from 1000 to 500 000 g/mol, preferably from 2000 to 300 000 g/mol, and the number-average molar mass $M_n$ is from 500 to 50 000 g/mol, preferably from 1000 to 40 000 g/mol, measured by means of gel permeation chromatography (GPC) using hexafluoroisopropanol as mobile phase and polymethyl methacrylate (PMMA) as standard.

The high-functionality polyetheramines of the invention are mostly prepared in the pressure range from 0.1 mbar to 20 bar, preferably at from 1 mbar to 5 bar, in reactors or reactor cascades, which are operated batchwise, semicontinuously, or continuously.

The abovementioned adjustment of the reaction conditions and, if appropriate, the selection of the suitable solvent permit further processing of the products of the invention after preparation without further purification.

The reaction mixture can, if necessary, be subjected to decolorization, for example via treatment with activated charcoal or with metal oxides, e.g. aluminum oxide, silicon oxide, magnesium oxide, zirconium oxide, boron oxide, or a mixture thereof, in amounts of, for example, from 0.1 to 50% by weight, preferably from 0.5 to 25% by weight, particularly preferably from 1 to 10% by weight, at temperatures of, for example, from 10 to 100° C., preferably from 20 to 80° C., and particularly preferably from 30 to 60° C.

The reaction mixture can also, if appropriate, be filtered to remove any sediments that may be present.

In another preferred embodiment, the product is stripped, i.e. freed from low-molecular-weight, volatile compounds. For this, once the desired degree of conversion has been reached, the catalyst can optionally be deactivated, and the low-molecular-weight volatile constituents, e.g. water, the amino alcohols used as starting material, or volatile oligomers or cyclic compounds can be removed by distillation, if appropriate with introduction of a gas, preferably nitrogen, or noble gases, if appropriate at reduced pressure.

The high-functionality highly branched polyetheramines formed by the process of the invention have termination by hydroxy groups after the reaction, i.e. without further modification. They have good solubility in various solvents, e.g. in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate, or propylene carbonate.

The molding compositions of the invention can comprise, as component C), from 0 to 70% by weight, in particular up to 50% by weight, of further added materials and processing aids, these being different from B) and/or from A).

According to the invention, the thermoplastic molding compositions can comprise, as component C), from 0.01 to 30% by weight of at least one polyethyleneimine homo- or copolymer. The proportion of C) is preferably from 0.3 to 4% by weight, and in particular from 0.3 to 3% by weight, based on A) to C).

For the purposes of the present invention, polyethyleneimines are either homo- or copolymers, obtainable by way of example by the processes in Ullmann under the heading "Aziridines", electronic release, or according to WO-A 94/12560.

The homopolymers are generally obtainable via polymerization of ethyleneimine (aziridine) in aqueous or organic solution in the presence of compounds which cleave to give acids, or of acids or Lewis acids. These homopolymers are branched polymers which generally comprise primary, secondary, and tertiary amino groups in a ratio of about 30%:40%:30%. The distribution of the amino groups can generally be determined by $^{13}$C NMR spectroscopy.

The comonomers used preferably comprise compounds which have at least two amino functions. Suitable comonomers which may be mentioned as examples are alkylenediamines having from 2 to 10 carbon atoms in the alkylene radical, preferably ethylenediamine or propylenediamine. Other suitable comonomers are diethylenetriamine, triethylenetetramine, tetraethylenepentamine, dipropylenetriamine, tripropylenetetramine, dihexamethylenetriamine, aminopropylethylenediamine, and bisaminopropylethylenediamine.

The average (weight-average) molecular weight (determined by light scattering) of polyethyleneimines is usually from 100 to 3 000 000, preferably from 800 to 2 000 000.

Other suitable polyethyleneimines are crosslinked polyethyleneimines obtainable by reacting polyethyleneimines with bi- or polyfunctional crosslinking agents having, as functional group, at least one halohydrin, glycidyl, aziridine, or isocyanate unit, or one halogen atom. Examples which may be mentioned are epichlorohydrin, and bischlorohydrin ethers of polyalkylene glycols having from 2 to 100 units of ethylene oxide and/or of propylene oxide, and also the compounds listed in DE-A 19 93 17 20 and U.S. Pat. No. 4,144,123. Processes for preparing crosslinked polyethyleneimines are known inter alia from the abovementioned publications, and also EP-A 895 521 and EP-A 25 515.

Grafted polyethyleneimines are also suitable, and the grafting agents used here may be any of the compounds which can react with the amino and/or imino groups of the polyethyleneimines. Suitable grafting agents and processes for preparing grafted polyethyleneimines are found in EP-A 675 914, for example.

Polyethyleneimines which are similarly suitable for the purposes of the invention are amidated polymers, which are usually obtainable by reaction of polyethyleneimines with carboxylic acids, or with their esters or anhydrides, or with carboxamides or with carbonyl halides. As a function of the proportion of the amidated nitrogen atoms in the polyethyleneimine chain, the amidated polymers can subsequently be crosslinked by the crosslinking agents mentioned. It is preferable here that up to 30% of the amino functions are amidated, thus leaving a sufficient number of primary and/or secondary nitrogen atoms available for any crosslinking reaction that follows.

Alkoxylated polyethyleneimines are also suitable and by way of example are obtainable by reaction of polyethyleneimine with ethylene oxide and/or propylene oxide. These alkoxylated polymers can then also be crosslinked.

Other suitable polyethyleneimines of the invention that may be mentioned are polyethyleneimines containing hydroxy groups and amphoteric polyethyleneimines (incorporating anionic groups), and also lipophilic polyethyleneimines, which are generally obtained via incorporation of long-chain hydrocarbon radicals into the polymer chain. Processes for the preparation of these polyethyleneimines are known to the person skilled in the art, and no further details need therefore be given in this connection.

The molding compositions of the invention can comprise, as component C), from 0 to 3% by weight, preferably from 0.05 to 3% by weight, with preference from 0.1 to 1.5% by weight, and in particular from 0.1 to 1% by weight, of a lubricant.

Preference is given to salts of Al, of alkali metals, or of alkaline earth metals, or esters or amides of fatty acids having from 10 to 44 carbon atoms, preferably having from 14 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as other components C), heat stabilizers or antioxidants, or a mixture of these, selected from the group of the copper compounds, sterically hindered phenols, sterically hindered aliphatic amines, and/or aromatic amines.

The PA molding compositions of the invention comprise from 0.05 to 3% by weight, preferably from 0.1 to 1.5% by weight, and in particular from 0.1 to 1% by weight, of copper compounds, preferably in the form of Cu(I) halide, in particular in a mixture with an alkali metal halide, preferably KI, in particular in the ratio 1:4, or using a sterically hindered phenol or using an amine stabilizer, or a mixture of these.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if a concentrate comprising polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogeneous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols are in principle any of the compounds having a phenolic structure and having at least one bulky group on the phenolic ring.

By way of example, compounds of the formula

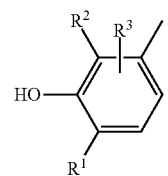

can preferably be used, in which:

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is that derived from substituted benzenecarboxylic acids, in particular from substituted benzenepropionic acids.

Particularly preferred compounds from this class are compounds of the formula

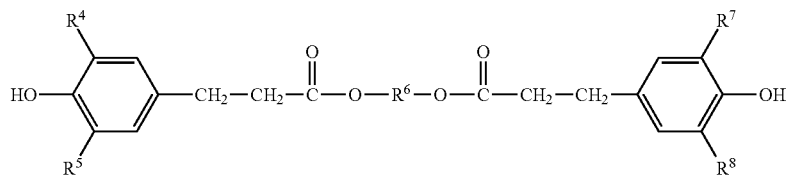

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to this formula are

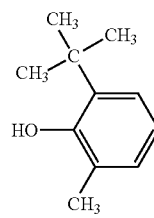 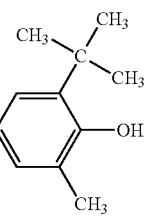

(Irganox® 245 from Ciba-Geigy)

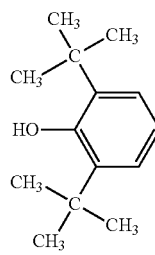 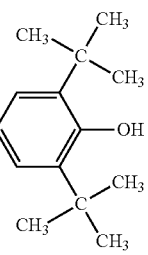

(Irganox® 259 from Ciba-Geigy)

A list of compounds that may be mentioned as examples of sterically hindered phenols is as follows:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxyphenyl)-propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxybenzyl)benzene, 4,4'-methylenebis(2,6-di-tert-butylphenol), 3,5-di-tert-butyl-4-hydroxybenzyldimethylamine.

Compounds which have proven particularly effective and which are therefore used with preference are 2,2'-methylenebis(4-methyl-6-tert-butylphenol), 1,6-hexanediol bis(3,5-di-tert-butyl-4-hydroxyphenyl)propionate (Irganox® 259), pentaerythrityl tetrakis[3-(3,5-di-tert-butyl-4-hydroxyphenyl)propionate], and also N,N'-hexamethylenebis-3,5-di-tert-butyl-4-hydroxyhydrocinnamide (Irganox® 1098), and the product Irganox® 245 described above from Ciba Geigy, which has particularly good suitability.

The amount used of the phenolic antioxidants, which can be used individually or in the form of mixtures, is from 0.05 to 3% by weight, preferably from 0.1 to 1.5% by weight, in particular from 0.1 to 1% by weight, based on the total weight of the molding compositions A) to C).

In some instances, sterically hindered phenols which have proven particularly advantageous are those having not more than one sterically hindered group in ortho-position with respect to the phenolic hydroxy group; this is particularly the case when colorfastness is assessed on storage in diffuse light over prolonged periods.

Fibrous or particulate fillers C) that may be mentioned are carbon fibers, glass fibers, glass beads, amorphous silica, calcium silicate, calcium metasilicate, magnesium carbonate, kaolin, chalk, powdered quartz, mica, barium sulfate, and feldspar, the amounts used of these being up to 40% by weight, in particular from 1 to 15% by weight.

Preferred fibrous fillers that may be mentioned are carbon fibers, aramid fibers, and potassium titanate fibers, particular preference being given here to glass fibers in the form of E glass. These can be used in the form of rovings or chopped glass in the forms commercially available.

To improve compatibility with the thermoplastic, the fibrous fillers can have been surface-pretreated with a silane compound.

Suitable silane compounds are those of the general formula

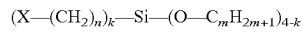

where the substituents are defined as follows:
X is

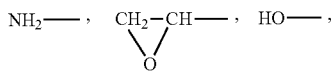

n is a whole number from 2 to 10, preferably from 3 to 4
m is a whole number from 1 to 5, preferably from 1 to 2
k is a whole number from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

The amounts generally used of the silane compounds for surface coating are from 0.01 to 2% by weight, preferably from 0.025 to 1.0% by weight, and in particular from 0.05 to 0.5% by weight (based on the fibrous fillers).

Acicular mineral fillers are also suitable.

For the purposes of the invention, acicular mineral fillers are mineral fillers with very pronounced acicular character. An example which may be mentioned is acicular wollastonite. The L/D (length/diameter) ratio of the mineral is preferably from 8:1 to 35:1, with preference from 8:1 to 11:1. If appropriate, the mineral filler may have been pretreated with the abovementioned silane compounds; however, this pretreatment is not essential.

Further fillers that may be mentioned are kaolin, calcined kaolin, wollastonite, talc, and chalk, and also lamellar or acicular nanofillers, the amounts of these preferably being from 0.1 to 10%. Preference is given to use of boehmite, bentonite, montmorillonite, vermiculite, hectorite, and laponite for this purpose. In order to obtain good compatibility of the lamellar nanofillers with the organic binder, organic modification is provided of the lamellar nanofillers according to the prior art. Addition of the lamellar or acicular nanofillers to the inventive nanocomposites brings about a further increase in mechanical strength.

In particular, talc is used, this being a hydrated magnesium silicate whose constitution is $Mg_3[(OH)_2/Si_4O_{10}]$ or $3MgO.4SiO_2.H_2O$. These "three-layer phyllosilicates" triclinic, monoclinic, or rhombic crystal structure, with lamellar habit. Other trace elements which may be present are Mn, Ti, Cr, Ni, Na, and K, and the OH group may to some extent have been replaced by fluoride.

It is particularly preferable to use talc comprising 99.5% of particles whose sizes are <20 μm. The particle size distribution is usually determined via sedimentation analysis, and is preferably:

<20 μm 99.5% by weight
<10 μm 99% by weight
<5 μm 85% by weight
<3 μm 60% by weight
<2 μm 43% by weight.

Products of this type are commercially available as Micro-Talc I.T. extra (Omya).

Examples of impact modifiers as component C) are rubbers, which can have functional groups. It is also possible to use a mixture composed of two or more different impact-modifying rubbers.

Rubbers which increase the toughness of the molding compositions generally comprise elastomeric content whose glass transition temperature is below −10° C., preferably below −30° C., and comprise at least one functional group capable of reaction with the polyamide. Examples of suitable functional groups are carboxylic acid, carboxylic anhydride, carboxylic ester, carboxamide, carboximide, amino, hydroxy, epoxy, urethane, or oxazoline groups, preferably carboxylic anhydride groups.

Among the preferred functionalized rubbers are functionalized polyolefin rubbers whose structure is composed of the following components:
1. from 40 to 99% by weight of at least one alpha-olefin having from 2 to 8 carbon atoms,
2. from 0 to 50% by weight of a diene,
3. from 0 to 45% by weight of a $C_1$-$C_{12}$-alkyl ester of acrylic acid or methacrylic acid, or a mixture of such esters,
4. from 0 to 40% by weight of an ethylenically unsaturated $C_2$-$C_{20}$ mono- or dicarboxylic acid or of a functional derivative of such an acid,
5. from 0 to 40% by weight of a monomer comprising epoxy groups, and
6. from 0 to 5% by weight of other monomers capable of free-radical polymerization where the entirety of components 3) to 5) is at least from 1 to 45% by weight, based on components 1) to 6).

Examples that may be mentioned of suitable alpha-olefins are ethylene, propylene, 1-butylene, 1-pentylene, 1-hexylene, 1-heptylene, 1-octylene, 2-methylpropylene, 3-methyl-1-butylene, and 3-ethyl-1-butylene, preferably ethylene and propylene.

Examples that may be mentioned of suitable diene monomers are conjugated dienes having from 4 to 8 carbon atoms, such as isoprene and butadiene, non-conjugated dienes having from 5 to 25 carbon atoms, such as penta-1,4-diene, hexa-1,4-diene, hexa-1,5-diene, 2,5-dimethylhexa-1,5-diene, and octa-1,4-diene, cyclic dienes, such as cyclopentadiene, cyclohexadienes, cyclooctadienes, and dicyclopentadiene, and also alkenylnorbornene, such as 5-ethylidene-2-norbornene, 5-butylidene-2-norbornene, 2-methallyl-5-norbornene, 2-isopropenyl-5-norbornene, and tricyclodienes, such as 3-methyltricyclo[$5.2.1.0^{2,6}$]-3,8-decadiene, or a mixture of these. Preference is given to hexa-1,5-diene, 5-ethylidenenorbornene, and dicyclopentadiene.

The diene content is preferably from 0.5 to 50% by weight, in particular from 2 to 20% by weight, and particularly preferably from 3 to 15% by weight, based on the total weight of the olefin polymer. Examples of suitable esters are methyl, ethyl, propyl, n-butyl, isobutyl, and 2-ethylhexyl, octyl, and decyl acrylates and the corresponding methacrylates. Among these, particular preference is given to methyl, ethyl, propyl, n-butyl, and 2-ethylhexyl acrylate and the corresponding methacrylate.

Instead of the esters, or in addition to these, acid-functional and/or latent acid-functional monomers of ethylenically unsaturated mono- or dicarboxylic acids can also be present in the olefin polymers.

Examples of ethylenically unsaturated mono- or dicarboxylic acids are acrylic acid, methacrylic acid, tertiary alkyl esters of these acids, in particular tert-butyl acrylate, and dicarboxylic acids, e.g. maleic acid and fumaric acid, or derivatives of these acids, or else their monoesters.

Latent acid-functional monomers are compounds which, under the polymerization conditions or during incorporation of the olefin polymers into the molding compositions, form free acid groups. Examples that may be mentioned of these are anhydrides of dicarboxylic acids having from 2 to 20 carbon atoms, in particular maleic anhydride and tertiary $C_1$-$C_{12}$-alkyl esters of the abovementioned acids, in particular tert-butyl acrylate and tert-butyl methacrylate.

Examples of other monomers that can be used are vinyl esters and vinyl ethers.

Particular preference is given to olefin polymers composed of from 50 to 98.9% by weight, in particular from 60 to 94.85% by weight, of ethylene and from 1 to 50% by weight, in particular from 5 to 40% by weight, of an ester of acrylic or methacrylic acid, from 0.1 to 20.0% by weight, and in particular from 0.15 to 15% by weight, of glycidyl acrylate and/or glycidyl methacrylate, acrylic acid, and/or maleic anhydride.

Particularly suitable functionalized rubbers are ethylene-methyl methacrylate-glycidyl methacrylate polymers, ethylene-methyl acrylate-glycidyl methacrylate polymers, ethylene-methyl acrylate-glycidyl acrylate polymers, and ethylene-methyl methacrylate-glycidyl acrylate polymers.

The polymers described above can be prepared by processes known per se, preferably via random copolymerization at high pressure and elevated temperature.

The melt index of these copolymers is generally in the range from 1 to 80 g/10 min (measured at 190° C. with a load of 2.16 kg).

Other rubbers that may be used are commercial ethylene-α-olefin copolymers which comprise groups reactive with polyamide. The underlying ethylene-α-olefin copolymers are prepared via transition-metal catalysis in the gas phase or in solution. The following α-olefins can be used as comonomers: propylene, 1-butene, 1-pentene, 4-methyl-1-pentene, 1-hexene, 1-heptene, 1-octene, 1-nonene, 1-decene, 1-undecene, 1-dodecene, styrene and substituted styrenes, vinyl esters, vinyl acetates, acrylic esters, methacrylic esters, glycidyl acrylates, glycidyl methacrylates, hydroxyethyl acrylates, acrylamides, acrylonitrile, allylamine; dienes, e.g. butadiene, isoprene.

Ethylene/1-octene copolymers, ethylene/1-butene copolymers, ethylene-propylene copolymers are particularly preferred, and compositions composed of from 25 to 85% by weight, preferably from 35 to 80% by weight, of ethylene, from 14.9 to 72% by weight, preferably from 19.8 to 63% by weight, of 1-octene or 1-butene, or propylene, or a mixture of these, from 0.1 to 3% by weight, preferably from 0.2 to 2% by weight, of an ethylenically unsaturated mono- or dicarboxylic acid, or of a functional derivative of such an acid, are particularly preferred.

The molar mass of these ethylene-α-olefin copolymers is from 10 000 to 500 000 g/mol, preferably from 15 000 to 400 000 g/mol (Mn, determined by means of GPC in 1,2,4-trichlorobenzene using PS calibration).

The proportion of ethylene in the ethylene-α-olefin copolymers is from 5 to 97% by weight, preferably from 10 to 95% by weight, in particular from 15 to 93% by weight.

One particular embodiment uses ethylene-α-olefin copolymers prepared by using what are known as "single site catalysts". Further details can be found in U.S. Pat. No. 5,272,236. In this case, the molecular-weight polydispersity of the ethylene-α-olefin copolymers is narrow for polyolefins: smaller than 4, preferably smaller than 3.5.

Another group of suitable rubbers that may be mentioned is provided by core-shell graft rubbers. These are graft rubbers which are prepared in emulsion and which are composed of at least one hard constituent and of at least one soft constituent. A hard constituent is usually a polymer whose glass transition temperature is at least 25° C., and a soft constituent is usually a polymer whose glass transition temperature is at most 0° C. These products have a structure composed of a core and of at least one shell, and the structure here results via the sequence of addition of the monomers. The soft constituents generally derive from butadiene, isoprene, alkyl acrylates, alkyl methacrylates, or siloxanes, and, if appropriate, from further comonomers. Suitable siloxane cores can, for example, be prepared starting from cyclic oligomeric octamethyltetrasiloxane or tetravinyltetramethyltetrasiloxane. By way of example, these can be reacted with γ-mercaptopropylmethyldimethoxysilane in a ring-opening cationic polymerization reaction, preferably in the presence of sulfonic acids, to give the soft siloxane cores. The siloxanes can also be crosslinked, for example by carrying out the polymerization reaction in the presence of silanes having hydrolyzable groups, such as halogen or alkoxy groups, e.g. tetraethoxysilane, methyltrimethoxysilane, or phenyltrimethoxysilane. Suitable comonomers that may be mentioned here are, for example, styrene, acrylonitrile, and crosslinking or graft-active monomers having more than one polymerizable double bond, e.g. diallyl phthalate, divinylbenzene, butanediol diacrylate, or triallyl(iso)cyanurate. The hard constituents generally derive from styrene, and from alpha-methylstyrene, and from their copolymers, and preferred comonomers that may be listed here are acrylonitrile, methacrylonitrile, and methyl methacrylate.

Preferred core-shell graft rubbers comprise a soft core and a hard shell, or a hard core, a first soft shell, and at least one further hard shell. Functional groups, such as carbonyl, carboxylic acid, anhydride, amide, imide, carboxylic ester, amino, hydroxy, epoxy, oxazoline, urethane, urea, lactam, or halobenzyl groups, are preferably incorporated here via addition of suitably functionalized monomers during polymerization of the final shell. Examples of suitable functionalized monomers are maleic acid, maleic anhydride, mono- or diesters or maleic acid, tert-butyl (meth)acrylate, acrylic acid, glycidyl (meth)acrylate, and vinyloxazoline. The proportion of monomers having functional groups is generally from 0.1 to 25% by weight, preferably from 0.25 to 15% by weight, based on the total weight of the core-shell graft rubber. The ratio by weight of soft to hard constituents is generally from 1:9 to 9:1, preferably from 3:7 to 8:2.

Such rubbers are known per se and are described by way of example in EP-A-0 208 187. Oxazine groups for functionalization can be incorporated by way of example according to EP-A-0 791 606.

Another group of suitable impact modifiers is provided by thermoplastic polyester elastomers. Polyester elastomers here are segmented copolyetheresters which comprise long-chain segments which generally derive from poly(alkylene) ether glycols and comprise short-chain segments which derive from low-molecular-weight diols and from dicarboxylic acids. Such products are known per se and are described in the literature, e.g. in U.S. Pat. No. 3,651,014. Appropriate products are also commercially available as Hytrel™ (Du Pont), Arnitel™ (Akzo), and Pelprene™ (Toyobo Co. Ltd.).

It is, of course, also possible to use a mixture of different rubbers.

The thermoplastic molding compositions of the invention can comprise, as further component C), conventional processing aids, such as stabilizers, oxidation retarders, further agents to counter decomposition by heat and decomposition by ultraviolet light, lubricants and mold-release agents, colorants, such as dyes and pigments, nucleating agents, plasticizers, flame retardants, etc.

Examples that may be mentioned of oxidation retarders and heat stabilizers are phosphites and further amines (e.g. TAD), hydroquinones, various substituted representatives of these groups, and their mixtures, at concentrations of up to 1% by weight, based on the weight of the thermoplastic molding composition.

UV stabilizers that may be mentioned, the amounts of which generally used are up to 2% by weight, based on the molding composition, are various substituted resorcinols, salicylates, benzotriazoles, and benzophenones.

Colorants that may be added are inorganic pigments, such as titanium dioxide, ultramarine blue, iron oxide, and carbon black and/or graphite, and also organic pigments, such as phthalocyanines, quinacridones, perylenes, and also dyes, such as nigrosin and anthraquinones.

Nucleating agents that can be used are sodium phenylphosphinate, aluminum oxide, silicon dioxide, and also preferably talc.

Flame retardants that may be mentioned are red phosphorus, P- and N-containing flame retardants, and also halogenated flame retardant systems and their synergists.

Preferred stabilizers are amounts of up to 2% by weight, preferably from 0.5 to 1.5% by weight, and in particular from 0.7 to 1% by weight, of aromatic secondary amines of the general formula I:

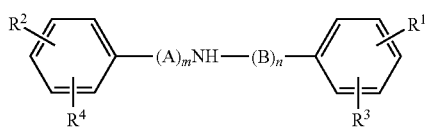

where
m and n=0 or 1,
A and B'$C_1$-$C_4$-alkyl- or phenyl-substituted tertiary carbon atom,
$R^1$, $R^2$=hydrogen or a $C_1$-$C_6$-alkyl group in ortho- or para-position, which may, if appropriate, have substitution by from 1 to 3 phenyl radicals, halogen, a carboxy group, or a transition metal salt of said carboxy group, and
$R^3$, $R^4$=hydrogen or a methyl radical in ortho- or para-position, if m plus n is 1, or a tertiary $C_3$-$C_9$-alkyl group in ortho- or para-position, which can, if appropriate, have substitution by from 1 to 3 phenyl radicals, if m plus n is 0 or 1.

Preferred radicals A or B are symmetrically substituted tertiary carbon atoms, particular preference being given to dimethyl-substituted tertiary carbon. Tertiary carbon atoms which have from 1 to 3 phenyl groups as substituents are equally preferred.

Preferred radicals $R^1$ or $R^2$ are para-t-butyl or tetramethyl-substituted n-butyl, where the methyl groups can preferably have been replaced by from 1 to 3 phenyl groups. Preferred halogens are chlorine and bromine. Examples of transition metals are those which can form transition metal salts with $R^1$ or $R^2$=carboxy.

Preferred radicals $R^3$ or $R^4$, for m plus n=2, are hydrogen, and for m plus n=0 or 1, a tert-butyl radical in ortho- or para-position, which in particular can have substitution by from 1 to 3 phenyl radicals.

Examples of secondary aromatic amines D) are
4,4'-bis(α,α'-tert-octyl)diphenylamine
4,4'-bis(α,α-dimethylbenzyl)diphenylamine
4,4'-bis(α-methylbenzhydryl)diphenylamine
4-(1,1,3,3-tetramethylbutyl)-4'-triphenylmethyldiphenylamine
4,4'-bis(α,α-p-trimethylbenzyl)diphenylamine
2,4,4'-tris(α,α-dimethylbenzyl)diphenylamine
2,2'-dibromo-4,4'-bis(α,α-dimethylbenzyl)diphenylamine
4,4'-bis(α,α-dimethylbenzyl)-2-carboxydiphenylaminin-ickel-4,4'-bis(α,α-dimethylbenzyl)diphenylamine
2-sec-butyl-4,4'-bis(α,α-dimethylbenzyl)diphenylamine
4,4'-bis(α,α-dimethylbenzyl)-2-(α-methylheptypdiphenylamine
2-(α-methylpentyl)-4,4'-ditrityldiphenylamine
4-α,α-dimethylbenzyl-4'-isopropoxydiphenylamine
2-(α-methylheptyl)-4'-(α,α-dimethylbenzyl)diphenylamine
2-(α-methylpentyl)-4'-trityldiphenylamine
4,4'-bis(tert-butyl)diphenylamine, and also

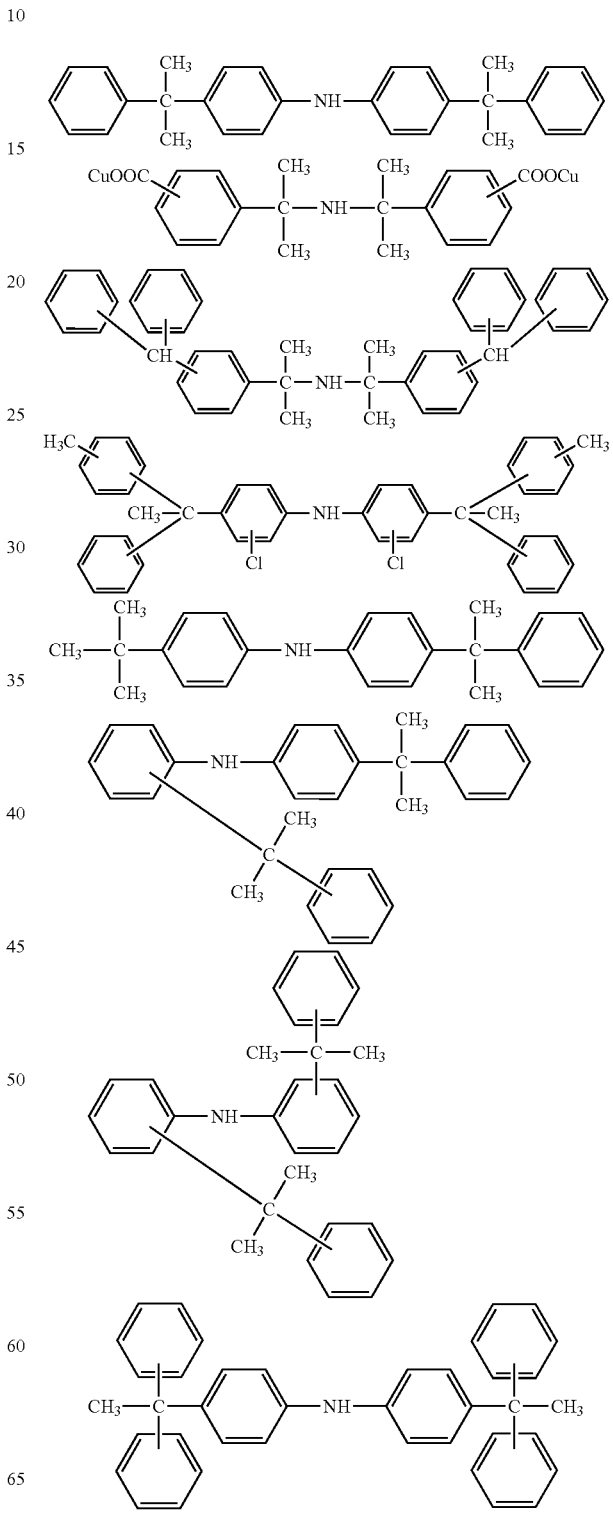

-continued

[chemical structures of secondary aromatic amines, including diphenylamine derivatives with various methyl and phenyl substituents, and one with a COOH group]

The preparation process is in accordance with the processes described in BE-A 67/05 00 120 and CA-A 9 63 594. Preferred secondary aromatic amines are diphenylamine and its derivatives, which are available commercially as Naugard® (Chemtura). These are preferred in combination with up to 2000 ppm, preferably from 100 to 2000 ppm, with preference from 200 to 500 ppm, and in particular from 200 to 400 ppm, of at least one phosphorus-containing inorganic acid or its derivatives.

Preferred acids are hypophosphorous acid, phosphorous acid, or phosphoric acid, and also salts thereof with alkali metals, particular preference being given to sodium and potassium. Preferred mixtures are in particular hypophosphorous and phosphorous acid and their respective alkali metal salts in a ratio of from 3:1 to 1:3. Organic derivatives of said acids are preferably ester derivatives of abovementioned acids.

The thermoplastic molding compositions of the invention can be prepared by processes known per se, by mixing the starting components in conventional mixing apparatuses, such as screw extruders, Brabender mixers, or Banbury mixers, and then extruding them. The extrudate can be cooled and comminuted. It is also possible to premix individual components and then to add the remaining starting materials individually and/or likewise mixed. The mixing temperatures are generally from 230 to 320° C.

In another preferred procedure, component B), and also, if appropriate, C) can be mixed with a prepolymer and compounded, and pelletized. The resultant pellets are then solid-phase condensed continuously or batchwise under an inert gas at a temperature below the melting point of component A) until the desired viscosity has been reached.

The thermoplastic molding compositions of the invention feature good mechanical properties and thermal stability, and good proccessability/flowability and weld line strength (vibration welding).

The materials are suitable for the production of fibers, of foils, or of moldings of any type. Some preferred examples are mentioned below:

Household items, electronic components, medical equipment, motor vehicle components, housings of electrical equipment, housings of electronic components in motor vehicles, wheel surrounds, door paneling, tailgates, spoilers, inlet manifolds, water tanks, housings of electrical tools.

Examples 1 Comp. to 4

The components used were as follows:
Component A/1:
Nylon-6 with intrinsic viscosity IV of 180 ml/g, measured as a 0.5% strength by weight solution in 96% strength by weight sulfuric acid at 25° C. to ISO 307. (Ultramid® B32 E from BASF AG was used).

Preparation of Components B/1, B/2, and B/3:
2000 g of triethanolamine (TEA) or triisopropanolamine (TIPA) and 13.5 g of 50% strength aqueous hypophosphorous acid are used as initial charge in a four-necked flask, equipped with stirrer, distillation bridge, gas inlet tube, and internal thermometer, and the mixture was heated to 230° C. At about 220° C., condensate slowly began to form. The reaction mixture was stirred at 230° C. for the time stated in table 1, and the condensate produced in the reaction here was removed by way of the distillation bridge by means of a moderate flow of nitrogen as stripper gas. Toward the end of the stated reaction time, remaining condensate was removed at a subatmospheric pressure of 500 mbar. After expiry of the time stated in table 1, the mixture was cooled to 140° C., and the pressure was reduced slowly and in stages to 100 mbar, in order to remove remaining volatile fractions.

The product mixture was then cooled to room temperature and analyzed.

Analysis of Products of the Invention:
The polyetheramine polyols were analyzed by gel permeation chromatography using a refractometer as detector. Hexafluoroisopropanol (HFIP) was used as mobile phase, and polymethyl methacrylate (PMMA) was used as standard for determining molecular weight.

OH number was determined to DIN 53240, part 2.

TABLE 1

Starting materials and final products

| Comp. No. | Amine | Reaktion time (h) | Molar mass, GPC (g/mol) Mn Mw | OH number (mg KOH/g) |
|---|---|---|---|---|
| B/1 | TEA | 4 | 4500/14 100 | 460 |
| B/2 | TIPA | 4 | 6100/10 300 | 400 |
| B/3 | TIPA | 4 | 7200/11 900 | 274 |

Component C/1:
Polyethyleneimine (PEI) with Mw of 1300 g/mol (GPC), the material used being Lupasol® G 20 from BASF AG.
Component C/2:
Glass fibers with an average thickness of 10 μm.
Component C/3:
Calcium stearate
Component C/4:

CuI/KJ in ratio 1:4
Component C/5:
Polyethylene masterbatch with 30% of carbon black.

Preparation of Molding Compositions

Components A) to C) were blended at 280° C. in a twin-screw extruder and extruded into a water bath. After pelletization and drying, test specimens were injection molded and tested. (280° C./80° C.).

MVR was determined to ISO 1133 at 270° C. with 5 kg load.

Charpy impact resistance with notch was determined to ISO 179-2/1 eA at 23° C.; and without notch at −30° C. to ISO 179-2/1 eU.

Tensile properties to ISO 527-2.
Modulus of elasticity to ISO 527-2.
Spiral path length was determined at 280° C. using a 1.5 mm flow spiral.

Table 2 shows the results of the measurements and the constitutions of the molding compositions.

TABLE 2

| Components [% by wt.] | | 1 comp. | 2 comp. | 3 | 4 |
|---|---|---|---|---|---|
| A1 | | 67.40 | 66.40 | 66.90 | 66.40 |
| B/1 | | — | — | 1.0 | 0.50 |
| C/1 | | — | 1.0 | — | 0.50 |
| C/2 | | 30 | 30 | 30 | 30 |
| C/3 | | 0.20 | 0.20 | 0.20 | 0.20 |
| C/4 | | 0.70 | 0.70 | 0.70 | 0.70 |
| C/5 | | 1.70 | 1.70 | 1.70 | 1.70 |
| Spiral length (280/1.5 mm) | cm | 32.1 | 44.1 | 39.1 | 45.9 |
| Spiral length | % | — | 37 | 21 | 42 |
| IV | ml/g | 137 | 119 | 134 | 118 |
| Charpy without notch (23° C.) | kJ/m$^2$ | 81 | 69 | 77 | 69 |
| Modulus of elasticity | MPa | 9890 | 9631 | 10016 | 9455 |
| Yield stress | MPa | 161.3 | 157 | 168 | 157 |
| Tensile stress at break | % | 3.2 | 2.8 | 3 | 2.9 |
| MVR (275/5) | ml/10 min | 35.5 | 72.2 | 43.9 | 85.4 |

Examples 5 Comp-13

Component A/2:
A semiaromatic nylon-6/6,T copolyamide (ratio 30:70) with IV of 130 ml/g to ISO 307 was used as component A/2.

Component A/3:
PA 6 with IV of 150 ml/g.

Components B/1, C/2, C/3, and C/5 were the same as those in examples 1 comp.-4.

Component C/6:
Fusabond® N NM493D from DuPont, ethylene-octene copolymer functionalized with maleic anhydride, MFR 1.5 g/10' (D1238, 190° C./2.16 kg).

Component C/7:
Ensaco 250 conductive carbon black from Timcal, characterized by porosity of 170 kg/m$^3$, determined to ASTM D1539-99.

Component C/8:
Naugard® 445
4,4'-bis(alpha,alpha-dimethylbenzyl)diphenylamine
CAS Number: 10081-67-1

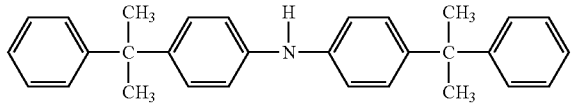

Component C/9:
Na hypophosphite
Component C/10:
Ca montanate
Component C/11:
20% strength nigrosin masterbatch in nylon-6

Production of Products

The components were mixed in a twin-screw extruder at a melt temperature of from 300 to 330° C. The melt was passed through a water bath and pelletized.

The test specimens were produced at a melt temperature of 330° C. and at a mold temperature of 100° C.

To test weld line strength, a tensile test (ISO 527-2) and a flexural test were carried out after vibration welding and after 300 h of heat-aging at 180° C.:

| | Test specimen |
|---|---|
| Mold | P10/4.0 (110 mm × 110 mm × 4 mm) plaques |
| Jointing area | 440 mm$^2$ |
| Conditioning prior to | |
| Welding | Drying: 80° C./24 h, Vacuum |
| Testing | Drying: 80° C./24 h, Vacuum Welding tests |
| Welding | Linear, butt, identical type |
| Welding pressure | 1.6 |
| Amplitude | 0.9 mm |
| Welding distance | 1.5 mm |
| Welds per setting | 8 |
| | Machine data |
| Vibration welding machine | Branson (M-102 H) |
| Welding frequency | about 240 Hz |
| Weld | Linear |
| Welding pressure | about 1.6 mPa |
| Amplitude | 0.9 mm |

Table 3 lists the results of the tests and the constitutions of the molding compositions.

TABLE 3

| comp. [% by wt.] | 5 comp. | 6 | 7 | 8 comp. | 9 | 10 | 11 comp. | 12 | 13 |
|---|---|---|---|---|---|---|---|---|---|
| A/2 | 93.68 | 92.68 | 93.18 | 59.38 | 58.38 | 58.88 | — | — | — |
| A/3 | — | — | — | — | — | — | 67.65 | 66.65 | 66.65 |
| B/1 | 1.0 | 0.5 | — | — | — | — | — | 1.0 | — |
| B/2 | | | | — | 1.0 | 0.5 | — | — | 1.0 |
| C/2 | | | | 35.0 | 35.0 | 35.0 | 30 | 30 | 30 |
| C/3 | 0.3 | 0.3 | 0.3 | 0.3 | 0.3 | 0.3 | 0.7 C/4 | 0.7 C/4 | 0.7 C/4 |

TABLE 3-continued

| comp. [% by wt.] | 5 comp. | 6 | 7 | 8 comp. | 9 | 10 | 11 comp. | 12 | 13 |
|---|---|---|---|---|---|---|---|---|---|
| C/6 | 4.0 | 4.0 | 4.0 | 4.0 | 4.0 | 4.0 | | | |
| C/7 | 1.0 | 1.0 | 1.0 | 0.65 | 0.65 | 0.65 | | | |
| C/8 | 1.0 | 1.0 | 1.0 | 0.65 | 0.65 | 0.65 | | | |
| C/9 | 0.025 | 0.025 | 0.025 | 0.017 | 0.017 | 0.017 | | | |
| C/10 | | | | | | | 0.2 | 0.2 | 0.2 |
| C/11 | | | | | | | 0.75 | 0.75 | 0.75 |
| Tensile modulus of elasticity [MPa] | 3107 | 3167 | 3177 | 11491 | 11592 | 11294 | 9800 | 9730 | 9870 |
| Yield stress [MPa] | 96 | | 96 (1 specimen) | | | | 184 | 180 | 187 |
| Tensile stress at break [MPa] | 61 | 78 | 85 | 187 | 187 | 186 | 4 | 3 | 3 |
| Tensile strain at yield [%] | 5.0 | | 4.9 (1 specimen) | 2.6 | 2.3 | 2.6 | 180.0 | 180.0 | 186 |
| Tensile strain at break [%] | 3.6 (1 specimen) | 2.9 | 3.5 (9 specimens) | | | | 3.8 | 3.2 | 3.3 |
| Notched Charpy impact resistance [kJ/m$^2$] | 10 | 7.6 | 8.6 | | | | 18 | 13.9 | 15.7 |
| Charpy impact resistance | | | | 86 | 82 | 82 | 108 | 93 | 99 |
| Processing | | | | | | | | | |
| Moisture [%] | 0.015 | 0.006 | 0.006 | 0.002 | 0.004 | 0.005 | | | |
| Flow path distance, T7, 1.5 mm MT: 320° C. Mold. T: 80° C. | 23.5 | 30.0 | 25.0 | 21.5 | 28.0 | 23.5 | 32.0 | 36.0 | 34.0 |
| Flow path distance, T7, 2 mm MT: 320° C. Mold T: 80° C. [cm] | 32.7 | 45.1–46.4 | 35.2 | 30.0 | 36.0 | 31.0 | | | |
| Tensile test after welding [MPa] | | | | | | | 89 | 78 | 84 |
| Tensile test after 300 h, 180° C. [MPa] | | | | | | | 48 | 56 | 53 |
| Flexural test after welding [MPa] | | | | | | | 175.0 | 138.0 | 164.0 |
| Flexural test after 300 h, 180° C. [MPa] | | | | | | | 118.0 | 104.0 | 142.0 |

Examples 14 Comp. to 16

Component A corresponded to A/2 of examples 5 comp.-13

Component B/3:
See Table 1

Component C/12:
Tafmer® MH 7010: ethylene-butene copolymer functionalized with 0.4% by weight of acrylic acid Component C/13:
Hyperbranched polycarbonate according to specification and table 1 of DE-A 10 2005 033 147.

Component C/14:
IT-Extra talc from Omya

Components C/3, C/7, C/8, and C/9 corresponded to those of the previous examples Component C/15:
Loxiol® VPG 861 from Cognis: pentaerythrityl tetrastearate.

Production of Products

The components were mixed in a twin-screw extruder at a melt temperature of from 300 to 330° C. The melt was passed through a water bath and pelletized.

The test specimens were produced at a melt temperature of 330° C. and at a mold temperature of 100° C.

The intrinsic viscosity of the polyamides was measured to DIN 53 727 on 0.5% strength by weight solutions in 96% by weight of sulfuric acid.

The heat resistance of the specimens was determined to ISO 75 (HDT B) (load 0.45 MPa, temperature rise of 50 K per hour, on ISO specimens). The notched impact resistance of the products was determined to ISO 179 1eA. The ductility of the products was characterized by using the ISO 6603 penetration test. The test was carried out on plaques of dimensions 60*60*3 mm.

Flowability was determined at 340° C. by measuring melt viscosity in a capillary rheometer. The values listed in the table were determined at a shear rate of $10^2$, $10^3$, and $10^4$ Hz.

Table 4 gives the constitutions of the molding compositions and the results of the tests.

TABLE 4

| Molding composition | 14 comp. | 15 comp. | 16 |
|---|---|---|---|
| A/2 | 70.9 | 70.5 | 70.4 |
| B/3 | — | — | 0.5 |
| C/3 | 0.3 | 0.3 | 0.3 |
| C/7 | 1 | 1 | 1 |
| C/8 | 0.78 | 0.78 | 0.78 |
| C/9 | 0.02 | 0.02 | 0.02 |
| C/12 | 16 | 16 | 16 |
| C/13 | — | 0.5 | — |
| C/14 | 10.5 | 10.4 | 10.5 |
| C/15 | 0.5 | 0.5 | 0.5 |
| HDT B [° C.] | 152 | 159 | 167 |
| ak, RT [kJ/m$^2$] | 11.9 | 12.5 | 13.9 |
| Ws, −30° C. [Nm] | 66 | 71 | 73 |
| Viscosity at 340° C. [Pa * s] | | | |
| $10^2$ Hz | 401 | 386 | 312 |
| $10^3$ Hz | 167 | 132 | 110 |
| $10^4$ Hz | 42 | 37 | 31 |

The invention claimed is:
1. A thermoplastic molding composition comprising
A) at least one thermoplastic polyamide in an amount of 10 to 99% by weight,

B) at least one hyperbranched polyetheramine in an amount of 0.01 to 30% by weight,
C) up to 70% by weight of additional materials,
where the total of the percentages by weight of components A), B) and C) is 100%;
wherein component B) has an average of at least 3 further functional OH groups in addition to the ether groups and the amino groups of the at least one hyperbranched polyetheramine.

2. The thermoplastic molding composition according to claim 1, where component B) has a glass transition temperature below 50° C.

3. The thermoplastic molding composition according to claim 1, where component B) has an OH number of from 100 to 900 mg KOH/g.

4. The thermoplastic molding composition according to claim 1, wherein component C) comprises 0.01 to 30% by weight of a polyethyleneimine homo- or copolymer.

5. The thermoplastic molding composition according to claim 1, wherein component B) is prepared by reacting at least one trialkanolamine with dialkanolamines, or with polyetherols having a functionality of two or higher.

6. The thermoplastic molding composition according to claim 1, in which component B) is prepared by intermolecular polycondensation of at least one trialkanolamine of the formula

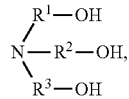

wherein $R^1$, $R^2$ and $R^3$, independently of one another, are identical or different alkylene groups having 2 to 10 carbon atoms.

7. A fiber, a foil or a molding, comprising a thermoplastic molding composition according to claim 1.

8. A method for improving the flowability and/or thermal stability of a thermoplastic polyamide comprising combining at least one hyperbranched polyetheramine with the thermoplastic polyamide, wherein the thermoplastic polyamide is present in an amount of 10 to 99% by weight, the at least one hyperbranched polyetheramine is utilized in an amount of 0.01 to 30% by weight, and up to 70% by weight of additional materials are added, where the total of the percentages by weight of components A), B) and C) is 100%;
wherein the at least one hyperbranched polyetheramine has an average of at least 3 further functional OH groups in addition to the ether groups and the amino groups of the at least one hyperbranched polyetheramine.

* * * * *

UNITED STATES PATENT AND TRADEMARK OFFICE
CERTIFICATE OF CORRECTION

PATENT NO. : 8,481,652 B2
APPLICATION NO. : 12/809478
DATED : July 9, 2013
INVENTOR(S) : Sachin Jain et al.

It is certified that error appears in the above-identified patent and that said Letters Patent is hereby corrected as shown below:

In the Specification:

At column 15, line number 32, please delete "laponite" and replace it with --LAPONITE® (manufactured by Rockwood Additives Limited)--

Signed and Sealed this
Twenty-fourth Day of December, 2013

Margaret A. Focarino
*Commissioner for Patents of the United States Patent and Trademark Office*